(12) United States Patent
Rezaee et al.

(10) Patent No.: US 8,401,285 B1
(45) Date of Patent: Mar. 19, 2013

(54) METHODS, APPARATUSES, AND COMPUTER PROGRAM PRODUCTS FOR CONTROLLING LUMINANCE OF NON-TISSUE OBJECTS WITHIN AN IMAGE

(75) Inventors: Mahmoud Ramze Rezaee, Vancouver (CA); Saba El-Hilo, Vancouver (CA)

(73) Assignee: McKesson Financial Holdings, Hamilton (BM)

( * ) Notice: Subject to any disclaimer, the term of this patent is extended or adjusted under 35 U.S.C. 154(b) by 53 days.

(21) Appl. No.: 13/233,656

(22) Filed: Sep. 15, 2011

(51) Int. Cl.
*G06K 9/34* (2006.01)
(52) U.S. Cl. ......... 382/164; 382/128; 382/162; 382/173
(58) Field of Classification Search .................. 382/164, 382/162, 173, 128, 133; 345/629; 250/458.1, 250/461.1; 600/123, 125, 317, 476
See application file for complete search history.

(56) References Cited

U.S. PATENT DOCUMENTS

| | | | |
|---|---|---|---|
| 5,818,624 A | 10/1998 | Patterson et al. | |
| 7,136,518 B2 * | 11/2006 | Griffin et al. | 382/133 |
| 7,459,696 B2 * | 12/2008 | Schomacker et al. | 250/458.1 |
| 7,469,160 B2 * | 12/2008 | Banks et al. | 600/476 |

OTHER PUBLICATIONS

Adams, R., et al.; "Seeded region growing"; IEEE Transactions on Pattern Analysis and Machine Intelligence; vol. 16; Issue 6; Jun. 1994; pp. 641-647.
Arifin, A.Z., et al.; "Image segmentation by histogram thresholding using hierarchical cluster analysis"; Pattern Recognition Letters; 2006; pp. 1-7.
Besl, P.J., et al.; "Segmentation Through Variable-Order Surface Fitting"; IEEE Transactions on Pattern Analysis and Machine Intelligence; vol. 10; Issue 2; Mar. 1998; pp. 167-192.
Cootes, T.F., et al.; "Active Appearance Models"; IEEE Transactions on Pattern Analysis and Machine Intelligence; vol. 23; No. 6; Jun. 2001; pp. 681-685.
Cootes, T.F., et al.; "Active Shape Models—Their Training and Application"; Computer Vision and Image Understanding; vol. 61; Issue 1; Jan. 1995; pp. 38-59.
Dijkstra, E.W.; "A Note on Two Problems in Connexion with Graphs"; Numerische Mathematik; vol. 1; 1959; pp. 269-271.
Pham, D.L., et al.; "Current Methods in Medical Image Segmentation"; Annual Review of Biomedical Engineering; vol. 2; Aug. 2000; pp. 315-337.
Rezaee, M.R., et al.; "A Multiresolution Image Segmentation Technique Based on Pyramidal Segmentation and Fuzzy Clustering"; IEEE Transactions on Image Processing; vol. 9; Issue 7; Jul. 2000; pp. 1238-1248.
Tanaka, N., et al.; "Application of Grayscale Standard Display Function to General Purpose Liquid-Crystal Display Monitors for Clinical Use"; Jul. 2009; pp. 25-32.
PS. 3.14-2009, Digital Imaging and Communications in Medicine (DICOM), Part 14: Grayscale Standard Display Function; National Electrical Manufacturers Association, 2009; 55 pages.
*About Gamma Correction* http://www.graphics.stanford.edu/gamma.html (3 pgs.) site visited Feb. 8, 2011 9:00 AM.
CGSD—Gamma Correction Explained http://www.siggraph.org/education/materials/HyperGraph/gamma_corr . . . (3 pgs.) Site visited Feb. 8, 2011 9:00 AM.

* cited by examiner

*Primary Examiner* — Anh Hong Do
(74) *Attorney, Agent, or Firm* — Alston & Bird LLP

(57) ABSTRACT

Methods, apparatuses, and computer program products are provided for controlling luminance of non-tissue objects within an image. A method may include determining one or more seed pixel values for an image. The method may further include determining, based at least in part on the one or more seed pixel values, one or more regions of the image that include non-tissue objects. The method may additionally include defining a mask comprising the determined one or more regions of the image. The method may also include calculating a mask pixel value based at least in part on a defined luminance value. The method may further include setting pixel values within the mask to the calculated mask pixel value. The method may additionally include causing masking of the image with the mask. Corresponding apparatuses and computer program products are also provided.

21 Claims, 7 Drawing Sheets

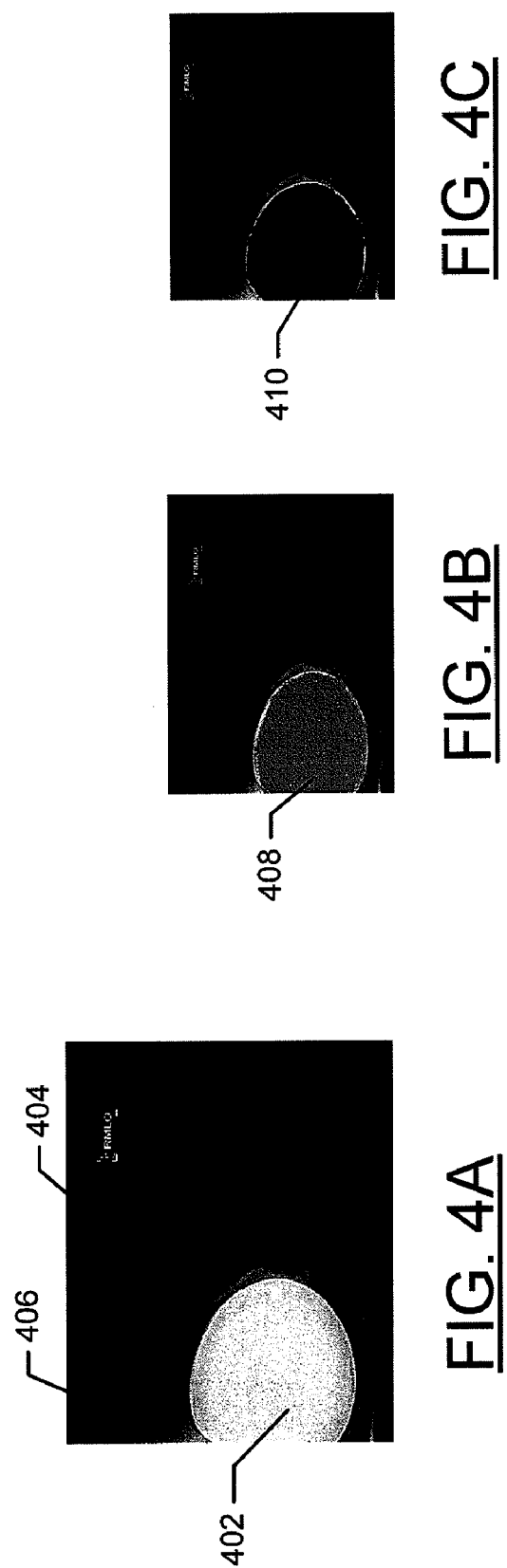

METHODS, APPARATUSES, AND COMPUTER PROGRAM PRODUCTS FOR CONTROLLING LUMINANCE OF NON-TISSUE OBJECTS WITHIN AN IMAGE

TECHNOLOGICAL FIELD

Embodiments of the present invention relate generally to medical imaging technology and, more particularly, to methods, apparatuses, and computer program products for controlling luminance of non-tissue objects within an image.

BACKGROUND

Breast cancer is a leading cause of death for women, and digital mammography screening is often used to help identify this cancer at its early development stage. In this regard, digital mammography devices are used to acquire mammogram images as part of screening procedures. The acquired mammogram images are sent to review workstations where radiologists review them for signs of cancer or other abnormalities. Mammography review stations are often located in dark reading rooms. The level of luminance in such environment is a very important factor that impact diagnostic accuracy, and regulations, such as the MSQA (Mammography Standard Quality Act) require that ambient light should be kept to a minimum level. In accordance with one recommended standard, the suggested maximum ambient light for mammography reading is about 5 lux, or 1.6 CD/m2 (Candela per square meter). Mammography images usually include a background portion (e.g., a substantially black portion) having a luminance level generally on the order of less than 0.6 CD/m2. However, external or other non-tissue objects, such as a clip, breast implant, and/or the like are generally rendered as relatively bright (e.g., substantially white) objects and often produce a luminance on the order of about 500 CD/m2. Depending on the relative size of such non-tissue objects compared to breast tissue, the brightness of non-tissue objects may introduce workflow issues impacting review of a mammogram image by a radiologist.

BRIEF SUMMARY OF SOME EXAMPLES OF THE INVENTION

Methods, apparatuses, and computer program products are herein provided for controlling luminance of non-tissue objects within an image. These methods, apparatuses, and computer program products may provide several advantages to radiologists, patients, and computing devices used for digital mammography. More particularly, some example embodiments identify non-tissue objects in an image, such as a mammogram image. Based on the identification of non-tissue objects in the image, some such example embodiments define a mask that may be used to mask the non-tissue objects in the image. In this regard, some example embodiments may mask identified non-tissue objects with pixels having a lower luminance than the luminance of the pixels in the region(s) containing non-tissue objects in the original image. Some such example embodiments may therefore reduce the contribution of potentially distracting light from regions of a mammogram or other medical image that may not carry any diagnostic data. Accordingly, the impact of non-tissue objects on the ability of a radiologist to review an image may be reduced. This reduction in impact may improve diagnosis results, thus potentially facilitating early detection of breast cancer and other abnormalities.

In a first example embodiment, a method for controlling luminance of non-tissue objects within an image is provided. The method of this example embodiment may comprise determining one or more seed pixel values for an image. The method of this example embodiment may further comprise determining, based at least in part on the one or more seed pixel values, one or more regions of the image that comprise a non-tissue object. The method of this example embodiment may additionally comprise defining a mask comprising the determined one or more regions of the image that comprise a non-tissue object. The method of this example embodiment may also comprise calculating a mask pixel value based at least in part on a defined luminance value. The method of this example embodiment may further comprise setting pixel values within the mask to the calculated mask pixel value. The method of this example embodiment may additionally comprise causing masking of the image with the mask.

In another example embodiment, an apparatus for controlling luminance of non-tissue objects within an image is provided. The apparatus of this example embodiment comprises at least one processor. The at least one processor may be configured to cause the apparatus of this example embodiment to at least determine one or more seed pixel values for an image. The at least one processor may be further configured to cause the apparatus of this example embodiment to determine, based at least in part on the one or more seed pixel values, one or more regions of the image that comprise a non-tissue object. The at least one processor may be additionally configured to cause the apparatus of this example embodiment to define a mask comprising the determined one or more regions of the image that comprise a non-tissue object. The at least one processor may also be configured to cause the apparatus of this example embodiment to calculate a mask pixel value based at least in part on a defined luminance value. The at least one processor may be further configured to cause the apparatus of this example embodiment to set pixel values within the mask to the calculated mask pixel value. The at least one processor may be additionally configured to cause the apparatus of this example embodiment to cause masking of the image with the mask.

In a further example embodiment, a computer program product for controlling luminance of non-tissue objects within an image is provided. The computer program product of this embodiment includes at least one non-transitory computer-readable storage medium having computer-readable program instructions stored therein. The program instructions of this example embodiment may comprise program instructions configured to determine one or more seed pixel values for an image. The program instructions of this example embodiment may further comprise program instructions configured to determine, based at least in part on the one or more seed pixel values, one or more regions of the image that comprise a non-tissue object. The program instructions of this example embodiment may additionally comprise program instructions configured to define a mask comprising the determined one or more regions of the image that comprise a non-tissue object. The program instructions of this example embodiment may also comprise program instructions configured to calculate a mask pixel value based at least in part on a defined luminance value. The program instructions of this example embodiment may further comprise program instructions configured to set pixel values within the mask to the calculated mask pixel value. The program instructions of this example embodiment may additionally comprise program instructions configured to cause the apparatus of this example embodiment to cause masking of the mage with the mask.

In yet another example embodiment, an apparatus for controlling luminance of non-tissue objects within an image is provided. The apparatus of this example embodiment may comprise means for determining one or more seed pixel values for an image. The apparatus of this example embodiment may further comprise means for determining, based at least in part on the one or more seed pixel values, one or more regions of the image that comprise a non-tissue object. The apparatus of this example embodiment may additionally comprise means for defining a mask comprising the determined one or more regions of the image that comprise a non-tissue object. The apparatus of this example embodiment may also comprise means for calculating a mask pixel value based at least in part on a defined luminance value. The apparatus of this example embodiment may further comprise means for setting pixel values within the mask to the calculated mask pixel value. The apparatus of this example embodiment may additionally comprise means for causing masking of the image with the mask.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
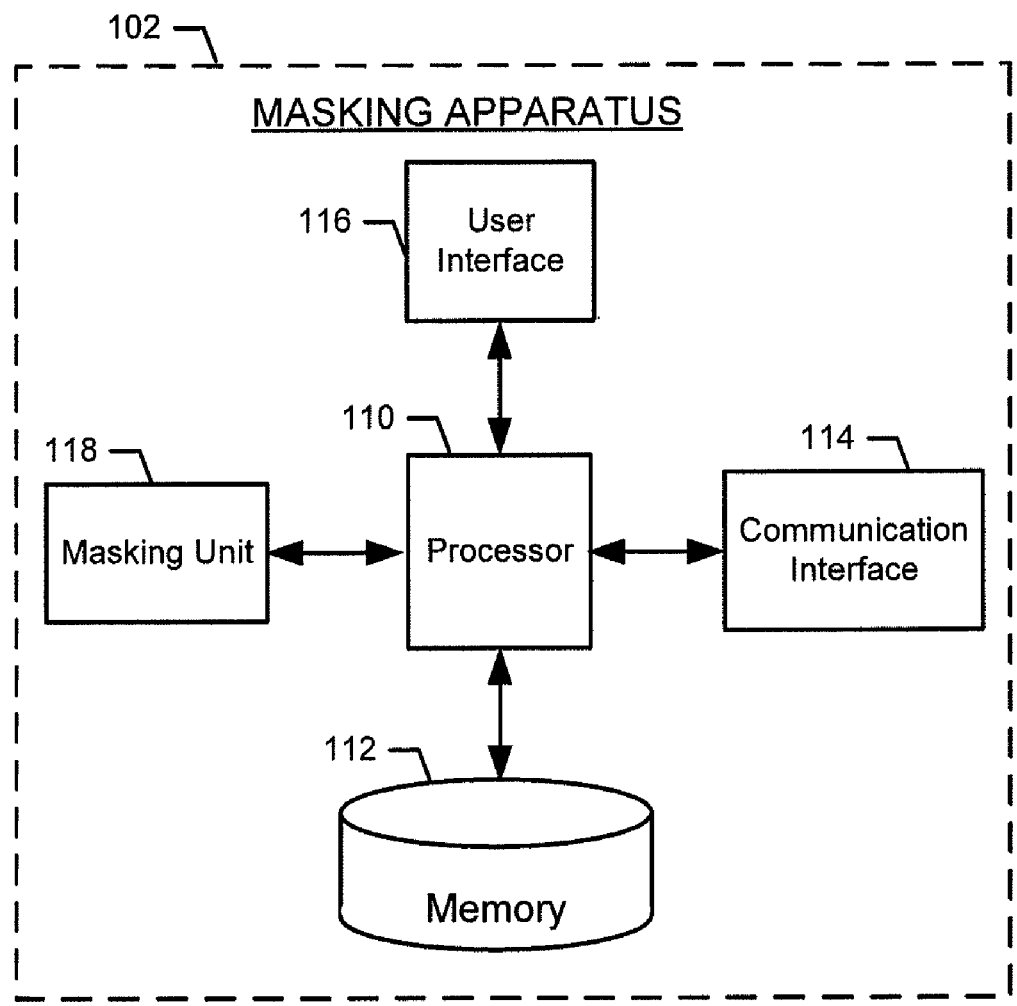
Figure 2:
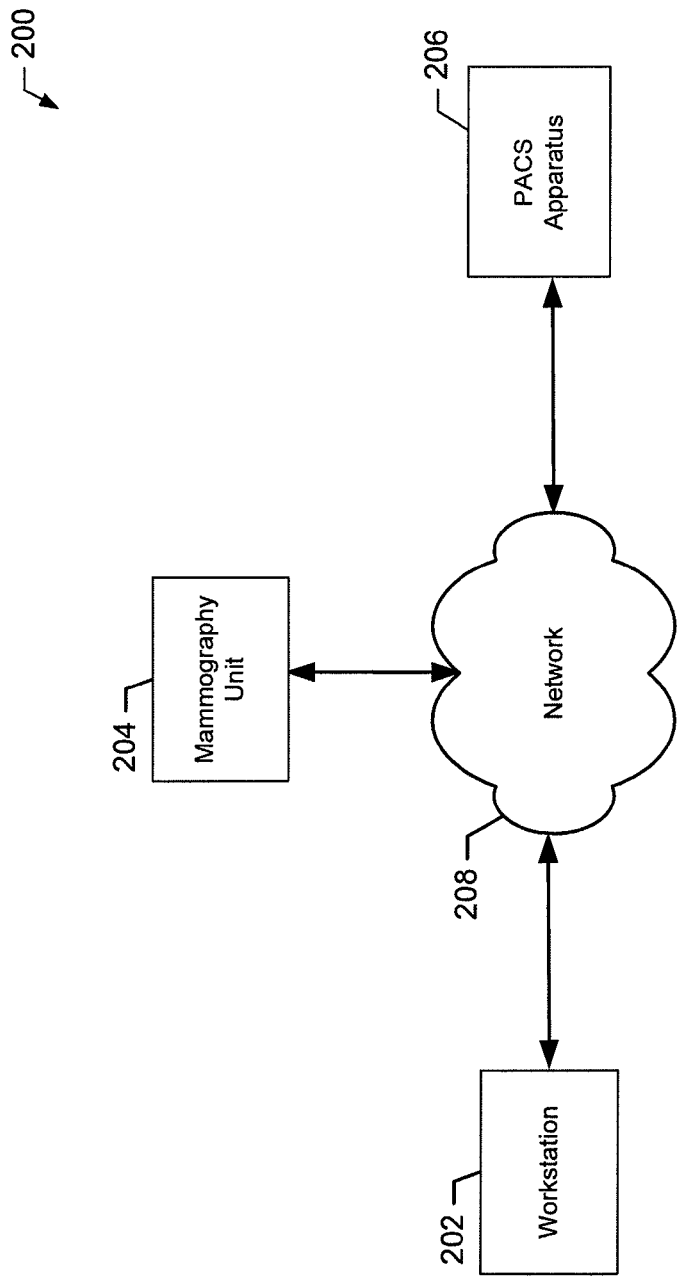
Figure 3C:
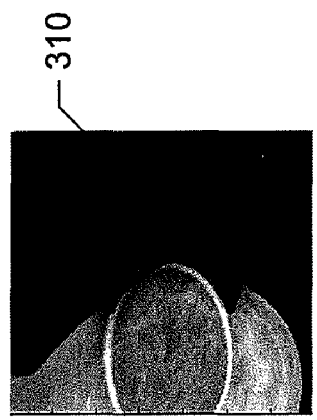
Figure 3B:
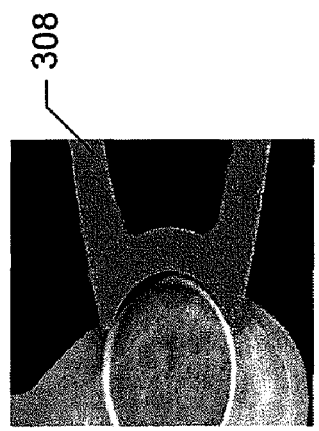
Figure 3A:
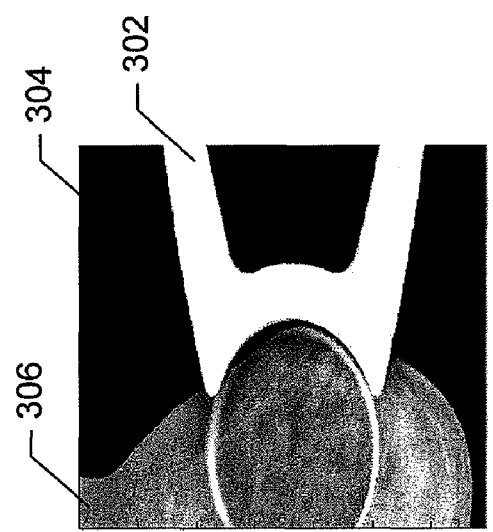
Figure 5:
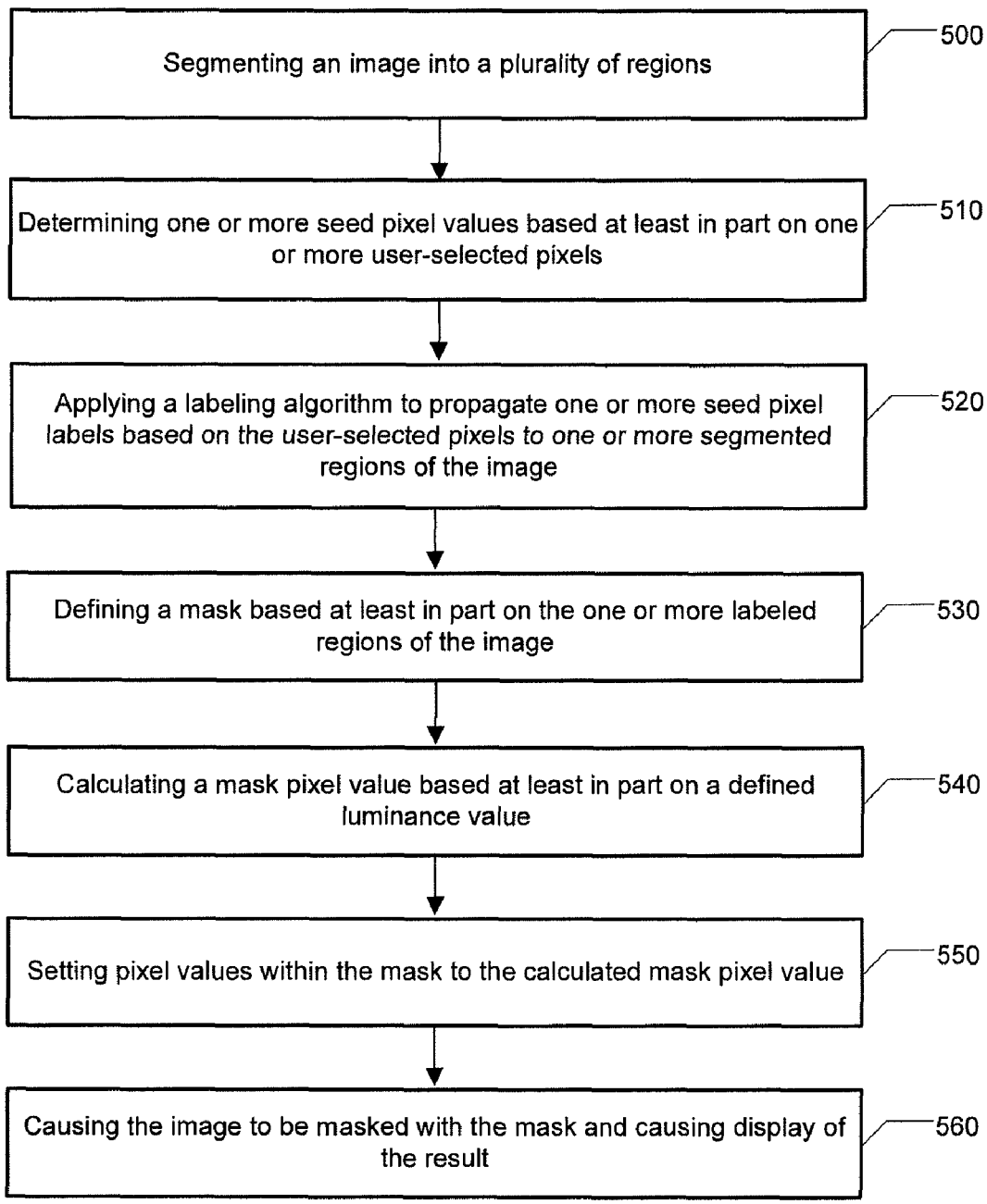
Figure 6:
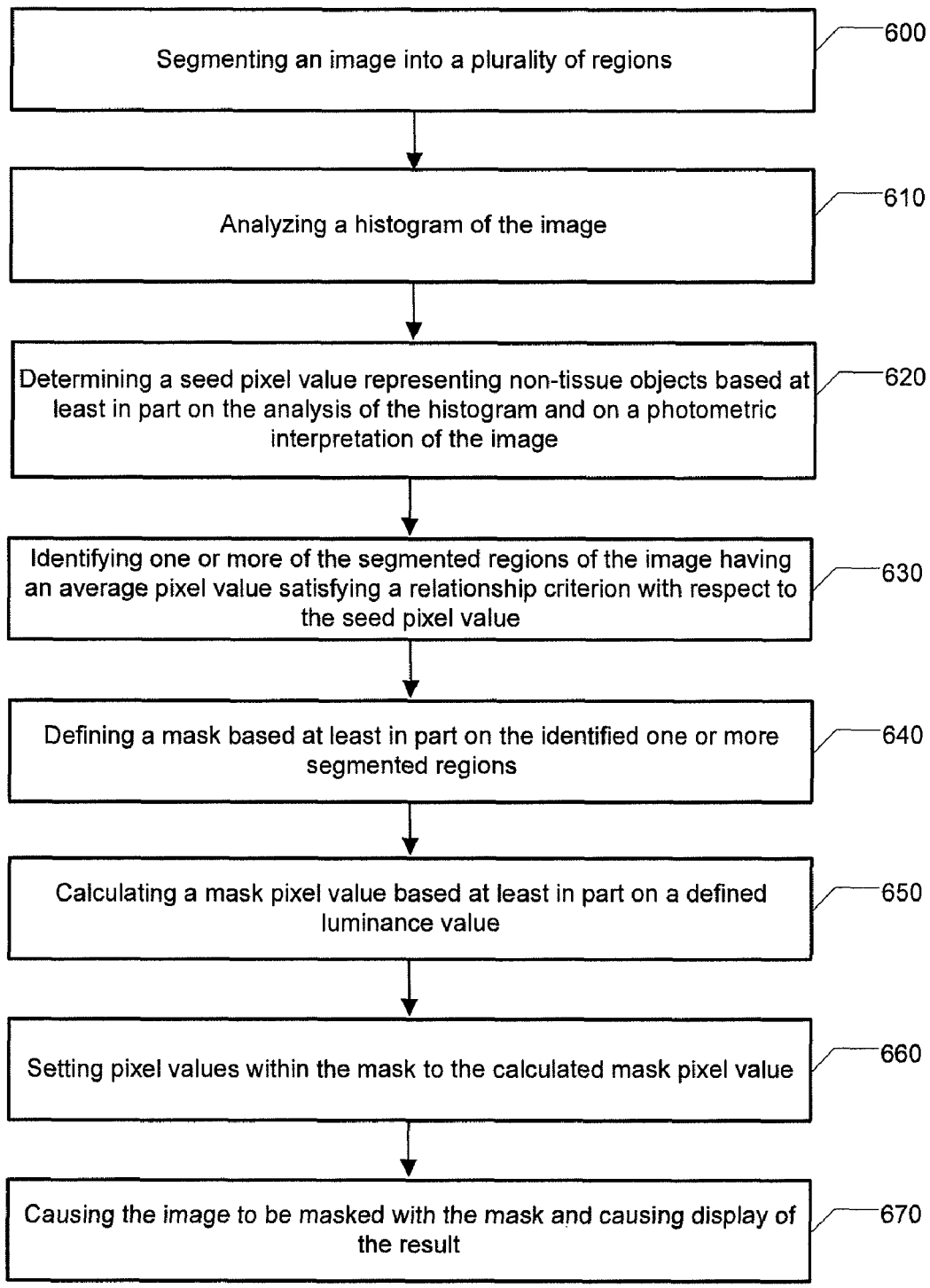
Figure 7:
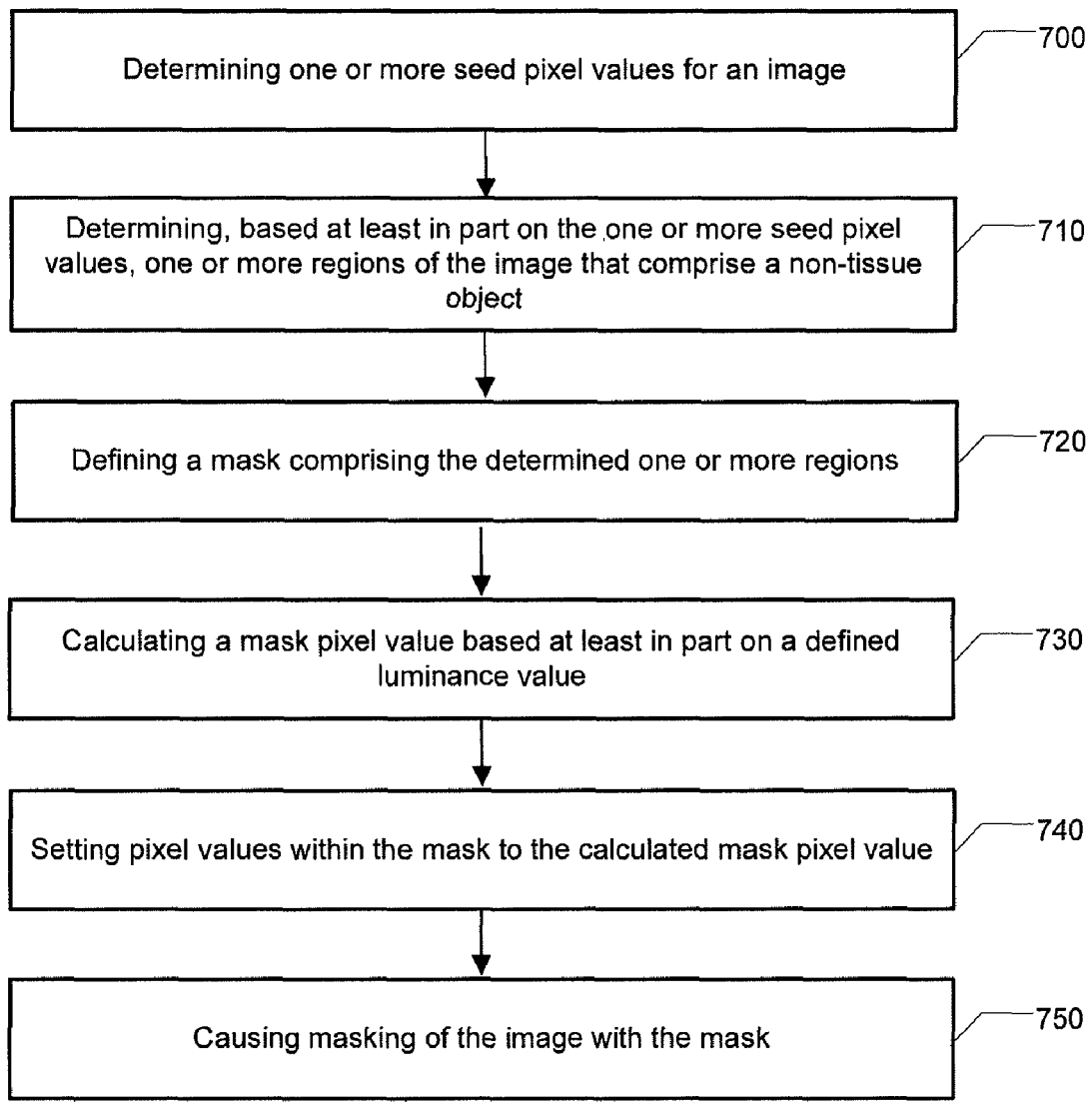

Having thus described embodiments of the invention in general terms, reference will now be made to the accompanying drawings, which are not necessarily drawn to scale, and wherein:

FIG. 1 illustrates a block diagram of a masking apparatus for controlling luminance of non-tissue objects within an image according to some example embodiments;

FIG. 2 illustrates a system for controlling luminance of non-tissue objects within an image according to some example embodiments;

FIGS. 3A-3C illustrate masking of a mammogram image to control luminance of non-tissue objects within the mammogram image according to some example embodiments;

FIGS. 4A-4C illustrate masking of a mammogram image to control luminance of non-tissue objects within the mammogram image according to some example embodiments;

FIG. 5 illustrates a flowchart according to an example semi-automatic method for controlling luminance of non-tissue objects within an image according to some example embodiments;

FIG. 6 illustrates a flowchart according to an example automatic method for controlling luminance of non-tissue objects within an image according to some example embodiments; and FIG. 7 illustrates a flowchart according to an example method for controlling luminance of non-tissue objects within an image according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, and/or the like.

As previously discussed, non-tissue objects within an image may have an undesirably high level of luminance compared to breast tissue or other tissue. The luminance of such non-tissue objects may be distracting to a radiologist, thus potentially introducing workflow issues impacting review of the image by the radiologist. Further, such non-tissue objects often do not carry anatomical information of value to a radiologist. Accordingly, some example embodiments provide for controlling luminance of non-tissue objects within an image by masking the non-tissue objects with pixels having lower luminance. In this regard, non-tissue objects may be identified and masked in accordance with some example embodiments with pixels that have a substantially similar luminance to the background (e.g., black), or at least with pixels having a luminance that does not produce an undesirable amount of extraneous light.

Referring now to FIG. 1, FIG. 1 illustrates a block diagram of a masking apparatus 102 for controlling luminance of non-tissue objects within an image according to some example embodiments. It will be appreciated that the masking apparatus 102 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an apparatus for controlling luminance of non-tissue objects within an image, numerous other configurations may also be used to implement embodiments of the present invention.

The masking apparatus 102 may be embodied as any computing device or combination of a plurality of computing devices configured to identify a region of interest within a mammogram image in accordance with one or more example embodiments. In this regard, by way of non-limiting example, the masking apparatus 102 may be at least partially embodied as one or more servers, a server cluster, a cloud computing infrastructure, one or more desktop computers, one or more laptop computers, one or more workstations, one or more network nodes, multiple computing devices in communication with each other, an entity(ies) of a Picture Archiving and Communication System (PACS), any combination thereof, and/or the like.

In some example embodiments the masking apparatus 102 includes various means for performing the various functions described herein. These means may include, for example, one or more of a processor 110, memory 112, communication interface 114, user interface 116, or masking unit 118 for performing the various functions herein described. The means of the masking apparatus 102 as described herein may be embodied as, for example, circuitry, hardware elements (e.g., a suitably programmed processor, combinational logic circuit, and/or the like), a computer program product comprising a computer-readable medium (e.g. memory 112) storing computer-readable program instructions (e.g., software or firmware) that are executable by a suitably configured processing device (e.g., the processor 110), or some combination thereof.

The processor 110 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 may comprise a plurality of processors. The plurality of processors may be embodied on a single computing device or may be distributed across a plurality of computing devices collectively configured to function as the masking apparatus 102. The plurality of processors may be in operative communication with each other and may be collectively configured to perform one or more functionalities of the masking apparatus 102 as described herein. In some embodiments, the processor 110 may be configured to execute instructions stored in the memory 112 or otherwise accessible to the processor 110. These instructions, when executed by the processor 110, may cause the masking apparatus 102 to perform one or more of the functionalities of the masking apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. Although illustrated in FIG. 1 as a single memory, the memory 112 may comprise a plurality of memories. The plurality of memories may be embodied on a single computing device or distributed across a plurality of computing devices. The memory 112 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 112 may comprise any non-transitory computer readable storage medium. The memory 112 may be configured to store information, data, applications, instructions, or the like for enabling the masking apparatus 102 to carry out various functions in accordance with example embodiments of the present invention. For example, in some example embodiments, the memory 112 is configured to buffer input data for processing by the processor 110. Additionally or alternatively, in some example embodiments, the memory 112 is configured to store program instructions for execution by the processor 110. The memory 112 may store information in the form of static and/or dynamic information. This stored information may be stored and/or used by the masking unit 118 during the course of performing its functionalities.

The communication interface 114 may be embodied as any device or means embodied in circuitry, hardware, a computer program product comprising a computer readable medium (e.g., the memory 112) storing computer readable program instructions executed by a processing device (e.g., the processor 110), or a combination thereof that is configured to receive and/or transmit data from/to another device, such as, for example, a workstation 202 (shown in FIG. 2), a Picture Archiving and Communication System (PACS) apparatus 206 (shown in FIG. 2), imaging modality 204 (shown in FIG. 2), and/or the like. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with another computing device. The communication interface 114 may be configured to receive and/or transmit data using any protocol that may be used for communications between computing devices. As an example, the communication interface 114 may be configured to receive and/or transmit data using any protocol and/or communications technology that may be used for communicating over a network, such as the network 208 illustrated in FIG. 2. The communication interface 114 may additionally be in communication with the memory 112, user interface 116, and/or masking unit 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the masking apparatus 102 is at least partially embodied on a radiologist's workstation (e.g., the workstation 202 illustrated in FIG. 2), the user interface 116 may comprise a display for displaying an image, which may be masked in accordance with one or more example embodiments. In some example embodiments wherein the masking apparatus 102 is embodied as one or more servers, aspects of the user interface 116 may be more limited, or the user interface 116 may be eliminated entirely. In embodiments including a user interface 116, the user interface 116 may be in communication with the memory 112, communication interface 114, and/or masking unit 118, such as via a bus.

The masking unit 118 may be embodied as various means, such as circuitry, hardware, a computer program product comprising a computer readable medium (e.g., the memory 112) storing computer readable program instructions executed by a processing device (e.g., the processor 110), or some combination thereof and, in some example embodiments, is embodied as or otherwise controlled by the processor 110. In embodiments wherein the masking unit 118 is embodied separately from the processor 110, the masking unit 118 may be in communication with the processor 110. The masking unit 118 may further be in communication with one or more of the memory 112, communication interface 114, or user interface 116, such as via a bus.

Referring now to FIG. 2, FIG. 2 illustrates a block diagram of a system 200 for controlling luminance of non-tissue objects within an image according to some example embodiments. In this regard, FIG. 2 illustrates an example of a system in which the masking apparatus 102 may be implemented. In at least some embodiments, the system 200 includes a workstation 202. The system 200 may further include an imaging modality 204 and/or a PACS (Picture Archiving and Communication System) apparatus 206, which may be configured to communicate with each other and/or with the workstation 200 over the network 208. The network 208 may comprise one or more wireless networks (e.g., a cellular network, wireless local area network, wireless metropolitan area network, and/or the like), one or more wireline networks (e.g., a wired local area network), or some combination thereof, and in some embodiments comprises at least a portion of the Internet.

A workstation 202 may be embodied as any computing device by which a radiologist or other user may access and view mammography images. As non-limiting examples, a workstation 202 may comprise a desktop computer, laptop computer, an access terminal, mobile terminal, mobile computer, mobile phone, mobile communication device, tablet computing device, or the like. While images (e.g., mammography images and/or other medical images) viewed on the workstation 202 may be locally stored, in some example embodiments, the viewed images may be accessed by the workstation 202 from one or more of an imaging modality 204 or PACS apparatus 206 over the network 208. Accordingly, in some example embodiments, at least some aspects of the user interface 116 may be implemented on a workstation 202.

The imaging modality 204 may comprise any device configured to capture a medical image. In some example embodiments, the imaging modality 204 may comprise a mammography unit configured to capture a mammogram image. The imaging modality 204 may be configured to send or otherwise provide access to a captured image to the workstation 202, where it may be viewed by a user of the workstation 202. Additionally or alternatively, the imaging modality 204 may be configured to send or otherwise provide access to a captured image to a PACS apparatus 206 so that the image may be stored and archived on a PACS.

The PACS apparatus 206 may accordingly comprise a server or other entity of a PACS, which may archive and store images, such as may be captured by the imaging modality 204. The PACS apparatus 206 may be configured to provide access to archived and stored images to the workstation 202 via the network 208 such that the images may be viewed by a user of the workstation 202. By way of non-limiting example, the PACS apparatus 206 may be embodied as one or more servers, a server cluster, a cloud computing infrastructure, one or more desktop computers, one or more laptop computers, one or more network nodes, multiple computing devices in communication with each other, any combination thereof, and/or the like.

In some example embodiments, the masking apparatus 102 may be at least partially implemented on the PACS apparatus 206. In such example embodiments, a non-tissue object(s) in an image requested by the workstation 202 may be identified and a corresponding mask may be defined on the PACS apparatus 206 in accordance with one or more example embodiments. The PACS apparatus 206 may accordingly be configured to provide a masked image and/or an image along with a corresponding mask to the workstation 202.

Additionally or alternatively, in some example embodiments, the masking apparatus 102 may be at least partially implemented on a workstation 202. In such example embodiments, a non-tissue object(s) in an image may be locally identified and masked at the workstation 202 in accordance with one or more example embodiments.

In view of the foregoing description of the system 200, it will be appreciated that in various embodiments, the masking apparatus 102 may be implemented on a workstation 202, on a PACS apparatus 206, or aspects of the masking apparatus 102 may be distributed across the elements of the system 200. However, it will be appreciated that the masking apparatus 102 is not limited to embodiment in the context of the system 200, and may comprise a stand-alone computing device or plurality of computing devices, which may be implemented within, or even outside of the context of the system 200.

In some example embodiments, the masking unit 118 associated with a masking apparatus 102 is configured to process an image to identify a non-tissue object(s) within the image and define a mask for the non-tissue objects, which may control the luminance of the identified non-tissue object(s) within the image. The image may, for example, comprise a medical image, such as a mammogram image. Some example embodiments described herein are described with respect to mammogram images. However, it will be appreciated that various embodiments may be applied to images in addition to or other than mammogram images. In this regard, some example embodiments may be applied to any image for which non-tissue objects may be identified and masked to control the luminance of the non-tissue objects.

In some example embodiments, the masking unit 118 may process images having a common defined input size. In such embodiments, this input size may be customizable, or may be implementation specific. For example, the input size may be set to 700×1000 pixels. If an image has a size other than the input size, the image may be scaled to the input size prior to processing by the masking unit 118.

The masking unit 118 may accordingly be configured to take as input an image, such as a mammogram image, for processing. The image may comprise an original mammogram image, such as may be captured by an imaging modality 204. Alternatively, the image may comprise a scaled or otherwise altered version of an original image.

The masking unit 118 may be configured to determine one or more seed pixel values for an input image. By way of example, the masking unit 118 may be configured to determine one or more user-selected pixels. In this regard, the image may be displayed on a display. The user may select one, or more points (e.g., pixels) on the image, such as by manipulating a cursor with a mouse or other input device, which may be provided by the user interface 116. In some example embodiments, a point selected by a user may be assumed to be a non-tissue object to be masked. Additionally or alternatively, in some example embodiments, the user may select a label for the selected point (e.g., mask, non-mask) to denote whether the point is representative of a portion of the image that should be masked, or if the point is representative of a portion of the image that should not be masked. In some example embodiments, user selection of a point may define a corresponding display coordinate (e.g., $(x_1, y_1)$) of the image and/or of a display on which the image is displayed. The masking unit 118 may be configured to resolve this coordinate to a corresponding pixel within the image. The masking unit 118 may be configured to determine the value(s) (e.g., gray scale value) of user selected pixel(s) as seed pixel values.

Additionally or alternatively, in some example embodiments, the masking unit 118 may be configured to at least partially autonomously determine a seed pixel value. More particularly, in some example embodiments, the masking unit 118 may be configured to calculate or otherwise obtain a histogram of the pixel values of the image. The masking unit 118 may analyze the histogram of the pixel values of the image and determine a non-tissue object contribution to the image histogram on the basis of a photometric interpretation of the image and determine a seed pixel value representing non-tissue objects in the image.

In some example embodiments wherein the image is a Digital Imaging and Communications in Medicine (DICOM) formatted image, the photometric interpretation of the image may be specified in a tag in a DICOM header, such as DICOM tag (0028, 0004). The photometric interpretation of the image may specify whether brighter objects are represented at a higher pixel value range or at a lower pixel value range. For example, if the image is a monochrome2 image, the brightest pixel value may be the highest pixel value (e.g., 1023 for a 10-bit image), while the darkest pixel value may be the lowest pixel value (e.g., 0). Thus, non-tissue objects may be represented by the highest pixel values in the image. Accordingly, if the image is a monochrome2 image, a pixel seed value may be determined that represents the contribution of pixels having a value greater than a threshold value (e.g., the highest pixel values) within the image. Alternatively, if the image is a monochrome1 image, the brightest pixel value may be the lowest pixel value (e.g., 0), while the darkest pixel value may be the highest pixel value (e.g., 1023 for a 10-bit image). Thus, non-tissue objects may be represented by the lowest pixel values in the image. As such, if the image is a monochrome1 image, a pixel seed value may be determined that represents the contribution of pixels having a value below a threshold value (e.g., the lowest pixel values) within the image.

In some example embodiments, analysis of the histogram of the image may comprise clustering the histogram in order to identify a seed pixel value representing the contribution of non-tissue objects to the image. For example, the histogram may be clustered (e.g., into a predefined number of clusters) to identify a cluster including high-intensity values representing the contribution of any non-tissue objects, such as wedges, labels, implants, and/or the like in the image. In this regard, adjacent bins of the histogram may be clustered, such as based on a similarity measure (e.g., a calculated distance between clusters), until a cluster is determined to represent the contribution of non-tissue objects. The cluster determined to represent the contribution of non-tissue objects may comprise the cluster comprising the highest pixel values in the image for a monochrome2 image, and may comprise the cluster comprising the lowest pixel values in the image for a monochrome1 image. The determined seed pixel value may, for example, comprise a threshold value representing the threshold pixel value separating the high intensity cluster from the lower intensity cluster(s). As another example, the determined seed pixel value may comprise a value representing an average of the seed pixel values of the high intensity cluster, a mean (weighted or unweighted) value of the pixels of the high intensity cluster, and/or the like. As still a further example, the masking unit 118 may be configured to determine the seed pixel value by calculating the gradient of the high intensity cluster and finding the peak value(s) on the basis of the calculated gradient.

The masking unit 118 may be further configured to use the one or more determined seed pixel values to determine one or more regions of the image that comprise a non-tissue object. In this regard, the masking unit 118 may be configured to segment the image into a plurality of regions. The segmentation of the image may be performed using any appropriate segmentation algorithm for splitting the image into regions, such as any of the algorithms set forth in CURRENT METHODS IN MEDICAL IMAGE SEGMENTATION, Annual Review of Biomedical Engineering, Vol. 2: 315-337, 2000 by Dzung L. Pham, Chenyang Xu, and Jerry L. Prince, the contents of which are incorporated herein by reference. By way of example and not by way of limitation, in some example embodiments, the masking unit 118 may be configured to segment the image by using pyramidal segmentation, as described in A MULTI-RESOLUTION IMAGE SEGMENTATION TECHNIQUE BASED ON PYRAMIDAL SEGMENTATION AND FUZZY CLUSTERING, IEEE Transaction on image processing, pages 1238-1248, 9 (7), JULY 2000 by Mahmoud Ramze Rezaee, et al., the contents of which are incorporated herein by reference.

The masking unit 118 may accordingly be configured in some example embodiments to use the one or more determined seed pixel values to determine one or more regions of the segmented image that comprise a non-tissue object. The masking unit 118 may be further configured to define a mask comprising the one or more regions determined to comprise a non-tissue object.

As an example, in some example embodiments wherein a user selects seed pixels, if a region of the image contains a designated seed pixel, the seed pixel label for that seed pixel (e.g., mask or non-mask) may be propagated by the masking unit 118 to other pixels of the region. The label(s) may be further propagated to similar regions. The masking unit 118 may use a region growing algorithm to combine regions, such as based on a similarity matrix, to facilitate label propagation and defining the mask. Any appropriate region growing technique or algorithm may be applied by the masking unit 118. By way of example, any of the region growing techniques described in SEEDED REGION GROWING, IEEE PAMI, 16 (6), pages 641-647, 1994 by Adams, R. and Cischof, L.; CURRENT METHODS IN MEDICAL IMAGE SEGMENTATION, Annual Review of Biomedical Engineering, Vol. 2: 315-337, 2000 by Dzung L. Pham, Chenyang Xu, and Jerry L. Prince; and REGION GROWING BASED ON SIMPLE SURFACE FITTING, SEGMENTATION THROUGH VARIABLE-ORDER SURFACE FITTING, IEEE Transactions on Pattern Analysis and Machine, Intelligence, 10(2), pp. 167-192, 1988, by Besl, P. J. and Jain, R. C., the contents of each of which are incorporated by reference, may be used for combining the labeled regions.

Additionally or alternatively, the masking unit 118 may be configured to merge regions using a clustering algorithm to facilitate label propagation and defining the mask. It will be appreciated that any appropriate clustering algorithm may be used by the masking unit 118. By way of example, and not by way of limitation, the Fuzzy C-means clustering algorithm described in A MULTI-RESOLUTION IMAGE SEGMENTATION TECHNIQUE BASED ON PYRAMIDAL SEGMENTATION AND FUZZY CLUSTERING, IEEE Transaction on image processing, pages 1238-1248, 9 (7), JULY 2000 by Mahmoud Ramze Rezaee, et al., the contents of which are incorporated herein by reference, may be used to merge labeled regions for defining the mask comprising the identified non-tissue object(s) in the image.

The masking unit 118 may accordingly be configured to define the mask on the basis of the results of label propagation. In this regard, the one or more regions determined to comprise a non-tissue object(s) (e.g., those regions/pixels labeled as being mask regions/pixels, non-tissue regions/pixels, or the like) may collectively define the mask.

In addition to or in lieu of determining regions of the image that comprise a non-tissue object through use of a labeling algorithm, in some example embodiments, the masking unit 118 may identify regions of the segmented image that have an average pixel value satisfying a relationship criterion with respect to a seed pixel value as comprising a non-tissue object. More particularly, as previously described, in some example embodiments, the masking unit 118 may autonomously determine a seed pixel value representing non-tissue objects. The masking unit 118 may accordingly be configured to compare the seed pixel value determined to represent non-tissue objects to an average pixel value of a region of the image to determine whether the average pixel value of the region satisfies a relationship criterion with respect to the seed pixel value. If it is determined that the average pixel value of the region does satisfy the relationship criterion, the masking unit 118 may identify the region as comprising a non-tissue object.

By way of example, in some example embodiments, a seed pixel value may comprise a threshold pixel value that may be used by the masking unit 118 to separate pixels representing non-tissue objects from other pixels. For example, if the image is a monochrome2 image wherein external objects may be represented by pixels having a higher pixel value, the masking unit 118 may be configured to determine regions of the image having an average pixel value that is higher than the seed pixel value determined to represent non-tissue objects. Alternatively, if the image is a monochrome1 image wherein external objects may be represented by pixels having a lower pixel value, the masking unit 118 may be configured to determine regions of the image having an average pixel value that is less than the seed pixel value determined to represent external objects.

As another example, the masking unit 118 may be configured to identify regions of the image having an average pixel value that is within a defined tolerance range of the seed pixel value. In this regard, for example, a region having an average pixel value that is at least substantially equal to the seed pixel value and/or that is at least within a tolerance range (e.g., within a range defined by +/−a tolerance level of the seed pixel value) may be identified as comprising a non-tissue object.

Regions of the image determined to satisfy the relationship criterion with respect to the seed pixel value may be merged to define the mask. For example, the masking unit 118 may determine the largest region determined to have an average pixel value satisfying the relationship criterion. Other regions determined to have an average pixel value satisfying the relationship criterion which are connected to the largest such region may be merged together with the largest region to define the mask.

The masking unit 118 may be additionally configured to calculate a mask pixel value based at least in part on a defined luminance value. The defined luminance value may be a specified value of a desired luminance which should be produced by masked non-tissue object pixels. In this regard the masking unit 118 may calculate a pixel value that produces the desired luminance level. Accordingly, that the mask region may be masked by setting the pixel values to the calculated mask pixel value such that the identified non-tissue object(s) in the image does not produce a luminance exceeding the defined luminance. The mask may therefore mask the non-tissue object(s) so as to reduce the luminance produced by the non-tissue object(s).

The defined luminance value may be configurable by a user (e.g., a radiologist). As another example, the luminance value may comprise a hard coded value, such as may be specified by a manufacturer of the masking apparatus 102, a manufacturer of a display apparatus on which the image may be displayed, and/or the like. In instances in which the image is a mammogram image, the luminance value may, for example, be specified in accordance with regulations that may govern reading mammogram images, such as the MSQA. In some example embodiments, the masking unit 118 may be configured to query a configuration file to determine the defined luminance value.

In some example embodiments, the masking unit 118 may be configured to calculate the mask pixel value based at least in part on a DICOM Gray Scale Display Function (GSDF), such as the DICOM 14 GSDF. More particularly, in some example embodiments, a monitor on which the image may be displayed may be calibrated according to the DICOM 14 GSDF. The masking unit 118 may accordingly calculate an index value, j(L), as a function of the defined luminance value, L. More particularly, it may be assumed that a given luminance value may produce a Just Noticeable Difference (JND) index according to:

$$j(L) = A + B \cdot \text{Log}_{10}(L) + C \cdot (\text{Log}_{10}(L))^2 + \\ D \cdot (\text{Log}_{10}(L))^3 + E \cdot (\text{Log}_{10}(L))^4 + F \cdot (\text{Log}_{10}(L))^5 + \\ G \cdot (\text{Log}_{10}(L))^6 + H \cdot (\text{Log}_{10}(L))^7 + I \cdot (\text{Log}_{10}(L))^8 \quad (1)$$

where $\text{Log}_{10}$ represents logarithm to the base 10, and A=71.498068, B=94.593053, C=41.912053, D=9.8247004, E=0.28175407, F=−1.1878455, G=−0.18014349, H=0.14710899, I=−0.017046845.

As such, the index value j(L) resulting from equation (1) may represent the JND value corresponding to Luminance "L." After determining the index value j(L), the mask pixel value, X, may be calculated as a function of the calculated index value j(L), a minimum luminance value, $j_{min}$, of a monitor on which the image is/will be displayed, and a maximum luminance value, $j_{max}$, of the monitor. The minimum and maximum luminance values of the monitor may, for example, be specified in a configuration file, which the masking unit 118 may be configured to query. In an instance in which the image is unsigned, the mask pixel value may be calculated according to the following:

$$X = \frac{j(L) - j_{min}}{j_{max} - j_{min}}(2^n - 1) \quad (2)$$

wherein n is a number of bits stored for each pixel value, which may be indicated by a header of the image. In this regard, for example, in embodiments wherein the image is a DICOM image, the masking unit 118 may be configured to determine n from the DICOM header tag (0028, 0101).

In an instance in which the mammogram image is signed, the mask pixel value may be calculated according to the following:

$$X = \frac{j(L) - j_{min}}{j_{max} - j_{min}}(2^n - 1) - 2^{n-1}. \quad (3)$$

The masking unit 118 may additionally be configured to set pixel values within the defined mask to the calculated mask pixel value and cause masking of the image with the mask. Accordingly, the luminance of region(s) of the image containing a non-tissue object may be reduced.

FIGS. 3A-3C illustrate masking of a mammogram image to control luminance of non-tissue objects within the mammogram image according to some example embodiments. FIG. 3A illustrates an original mammogram image, which may be processed and masked in accordance with one or more example embodiments. The image includes a clip, designated by reference number 302, which is the most luminant region of the image. In this regard, the clip 302 has a substantially greater luminance than the breast tissue 306 and the background portion 304. As the clip does not provide any anatomical information, the luminance of the clip region 302 may be distracting to a radiologist reviewing the breast tissue portion 306 of the image. FIG. 3B illustrates the image of FIG. 3A as it may be masked in accordance with some example embodiments. In this regard, FIG. 3B illustrates that the region of the image including the clip has been identified and masked by a mask 308 having pixels with a value having a substantially lower luminance than the pixels in the clip region 302 of the original image. FIG. 3C illustrates another example wherein the image of FIG. 3A has been masked in accordance with some example embodiments. In this regard, the clip region has been masked with a mask 310 having pixels with substantially the same luminance as the background portion 304 (e.g., black).

FIGS. 4A-4C illustrate masking of a mammogram image to control luminance of non-tissue objects within the mammogram image according to some example embodiments. FIG. 4A illustrates an original mammogram image, which may be processed and masked in accordance with one or more example embodiments. The image includes a breast implant 402, which is the most luminant region of the image. In this regard, the breast implant region 402 has a substantially greater luminance than the breast tissue 406 and the background portion 404. As the implant does not provide any anatomical information, the luminance of the implant region 402 may be distracting to a radiologist reviewing the breast tissue portion 406 of the image. FIG. 4B illustrates the image of FIG. 3A as it may be masked in accordance with some example embodiments. In this regard, FIG. 4B illustrates that the region of the image including the breast implant has been identified and masked by a mask 408 having pixels with a value having a substantially lower luminance than the pixels in the breast implant region 402 of the original image. FIG. 4C illustrates another example wherein the image of FIG. 4A has been masked in accordance with some example embodiments. In this regard, the breast implant region has been masked with a mask 410 having pixels with substantially the same luminance as the background portion 404 (e.g., black).

In some example embodiments activation and display of a mask for masking out a non-tissue portion of an image (e.g., the mask 308, 310, 408, 410, or the like) may be selectable. In this regard, a user may be able to selectively turn on or off a mask, such as through a GUI option, hot key, key combination, and/or other designated user input. Accordingly, using the examples of FIGS. 3A and 3B, if the mask is turned off, the image of FIG. 3A with the captured clip 302 may be displayed. However, if the mask is activated, the image of FIG. 3B with the clip masked by the mask 308 may be displayed.

Referring now to FIG. 5, FIG. 5 illustrates a flowchart according to an example semi-automatic method for controlling luminance of non-tissue objects within an image according to some example embodiments. In this regard, FIG. 5 illustrates a method that may be at least partially performed by a masking apparatus 102. The operations illustrated in and described with respect to FIG. 5 may, for example, be performed by, with the assistance of, and/or under the control of one or more of the processor 110, memory 112, communication interface 114, user interface 116, or masking unit 118. Operation 500 may comprise segmenting an image into a plurality of regions. The image may, for example, comprise a medical image, such as a mammogram image. Any appropriate segmentation methodology, including, for example, pyramidal segmentation, may be used to segment the mammogram image. Performance of the segmentation may be fully automated. The mammogram image may be displayed while the image is being segmented. Alternatively, segmentation of the image may occur prior to display of the image, in response to a request to display the image, and/or the like. The processor 110, memory 112, and/or masking unit 118 may, for example, provide means for performing operation 500. In some example embodiments, a user may select a hot key, click a button, and/or provide other input to invoke a masking algorithm. Operation 510 may comprise determining one or more seed pixel values based at least in part on one or more user-selected pixels in the image. In this regard, a user may select a label (e.g. mask or non-mask) and provide one or more seed points by moving a pointer (e.g. a mouse) and selecting one or more pixels (e.g. by clicking on a mouse). The number of seed points provided by the user may be specified by a particular implementation or, alternatively, may be up to the user. In this regard, in some example embodiments, the user may provide as many seed points as desired. The number of seed points provided may, however, affect the accuracy of the defined mask, as more seed points may enhance accuracy in some instances. Image display coordinates (e.g., $(x_1, y_1)$) may be defined for a selected pixel. If the user selects multiple pixels, a set of coordinates (e.g., $\{(x_1, y_1), (x_2, y_2), (x_3, y_3) \ldots (x_n, y_n)\}$ may be defined. The processor 110, memory 112, user interface 116, and/or masking unit 118 may, for example, provide means for performing operation 510. While segmentation of the image (operation 500) is illustrated and described to occur before user invocation of the masking algorithm and/or before determining the seed pixel values, it will be appreciated that the image may be segmented following invocation of the masking algorithm and/or following determination of the one or more seed pixel values. As such, the ordering of operations 500 and 510 is not limited to that order illustrated in FIG. 5.

Operation 520 may comprise applying a labeling algorithm to propagate one or more seed pixel labels based on the user-selected pixels to one or more segmented regions of the image. More particularly, after determining the coordinates for the one or more seed pixels, the seed pixels may be found in the segmented region. A labeling algorithm may be applied and a mask (or non-mask) label may be assigned to each seed pixel, such as based on the label selected by the user when selecting a seed point. The labeling algorithm may iteratively propagate the label(s) to all pixels in the segmented image by first labeling all pixels of the regions in which the seed(s) are located. Further labels may be propagated to similar regions, and a region growing algorithm may be used to combine regions based on certain similarity matrix. Additionally or alternatively, regions may be merged by a clustering algorithm. The processor 110, memory 112, and/or masking unit 118 may, for example, provide means for performing operation 520.

Operation 530 may comprise defining a mask based at least in part on the one or more labeled regions of the image. In this regard, after labeling propagation is completed, the mask region may be uniquely defined. The processor 110, memory 112, and/or masking unit 118 may, for example, provide means for performing operation 530. Operation 540 may comprise calculating a mask pixel value based at least in part on a defined luminance value. The processor 110, memory 112, and/or masking unit 118 may, for example, provide means for performing operation 540. Operation 550 may comprise setting pixel values within the mask to the calculated mask pixel value. The processor 110, memory 112, and/or masking unit 118 may, for example, provide means for performing operation 550. Operation 560 may comprise causing the image to be masked with the mask and causing display of the result. Accordingly, non-tissue object(s) within the mammogram image may be masked by the defined mask. The processor 110, memory 112, user interface 116, and/or masking unit 118 may, for example, provide means for performing operation 560. If the user is unsatisfied with the result, the process may be repeated so that the user may select different and/or additional seed pixels.

FIG. 6 illustrates a flowchart according to an example automatic method for controlling luminance of non-tissue objects within an image according to some example embodiments. In this regard, FIG. 6 illustrates a method that may be at least partially performed by a masking apparatus 102. The operations illustrated in and described with respect to FIG. 6 may, for example, be performed by, with the assistance of, and/or under the control of one or more of the processor 110, memory 112, communication interface 114, user interface 116, or masking unit 118. In some example embodiments, a user may select a hot key, click a button, and/or provide other input to invoke a masking algorithm. In other example embodiments, performance of the masking algorithm may be performed automatically (e.g., without requiring user input to invoke the masking algorithm), such as based on a default setting. Operation 600 may comprise segmenting an image into a plurality of regions. The image may, for example, comprise a medical image, such as a mammogram image. Any appropriate segmentation methodology, including, for example, pyramidal segmentation, may be used to segment the image. The image may be displayed while the image is being segmented. Alternatively, segmentation of the image may occur prior to display of the image, in response to a request to display the image, and/or the like. The processor 110, memory 112, and/or masking unit 118 may, for example, provide means for performing operation 600. In some example embodiments, the image may be rescaled to a predefined size, such as 700×1000 pixels if the image is larger or smaller than the predefined size. In embodiments wherein this scaling is performed, the scaling may be performed before or after segmentation of the image.

Operation 610 may comprise analyzing a histogram of the image. Operation 610 may further comprise calculating the histogram if the histogram has not been previously calculated, or is otherwise unavailable. The processor 110, memory 112, and/or masking unit 118 may, for example, provide means for performing operation 610. Operation 620 may comprise determining a seed pixel value representing non-tissue objects based at least in part on the analysis of the histogram and on a photometric interpretation of the image. The photometric interpretation may define whether the brightest pixels (e.g., non-tissue objects) are represented by the highest pixel values or by the lowest pixel values. In embodiments wherein the image is a DICOM image, the photometric interpretation may be indicated in DICOM tag (0028, 0004), which may indicate whether the image is a monochrome) image or a monochrome 2 image. The processor 110, memory 112, and/or masking unit 118 may, for example, provide means for performing operation 620.

Operation 630 may comprise identifying one or more of the segmented regions of the image having an average pixel value satisfying a relationship criterion with respect to the seed pixel value. For example, those regions having an average pixel value substantially close to, or within a predefined range of, the seed pixel value may be identified. The processor 110, memory 112, and/or masking unit 118 may, for example, provide means for performing operation 630. Operation 640 may comprise defining a mask based at least in part on the identified one or more segmented regions. By way of example, the biggest identified region(s) identified in operation 630 and any identified regions connected to the biggest region(s) may be merged together to define the mask. As another example, one or more pixels within the biggest identified region(s) may be determined as seed points and a region growing algorithm may be applied to grow regions from the seed points that may define the mask. The processor 110, memory 112, and/or masking unit 118 may, for example, provide means for performing operation 640.

Operation 650 may comprise calculating a mask pixel value based at least in part on a defined luminance value. The processor 110, memory 112, and/or masking unit 118 may, for example, provide means for performing operation 650. Operation 660 may comprise setting pixel values within the mask to the calculated mask pixel value. The processor 110, memory 112, and/or masking unit 118 may, for example, provide means for performing operation 660. Operation 670 may comprise causing the image to be masked with the mask and causing display of the result. Accordingly, non-tissue object(s) within the mammogram image may be masked by the defined mask. The processor 110, memory 112, user interface 116, and/or masking unit 118 may, for example, provide means for performing operation 670. In embodiments wherein the image may have been scaled prior to performing the masking operation, the mask applied to the image may be scaled to an appropriate size for the displayed version of the image. The user may be enabled to turn the mask on or off through use of a graphical user interface, key combination, and/or other input.

FIG. 7 illustrates a flowchart according to an example method for controlling luminance of non-tissue objects within an image according to some example embodiments. In this regard, FIG. 7 illustrates a method that may be performed by a masking apparatus 102. The operations illustrated in and described with respect to FIG. 7 may, for example, be performed by, with the assistance of, and/or under the control of one or more of the processor 110, memory 112, communication interface 114, user interface 116, or masking unit 118. Operation 700 may comprise determining one or more seed pixel values for an image. The image may, for example, comprise a medical image, such as a mammogram image. The processor 110, memory 112, user interface 116, and/or masking unit 118 may, for example, provide means for performing operation 700. Operation 710 may comprise determining, based at least in part on the one or more seed pixel values, one or more regions of the image that comprise a non-tissue object. The processor 110, memory 112, and/or masking unit 118 may, for example, provide means for performing operation 710. Operation 720 may comprise defining a mask comprising the determined one or more regions. The processor 110, memory 112, and/or masking unit 118 may, for example, provide means for performing operation 720. Operation 730 may comprise calculating a mask pixel value based at least in part on a defined luminance value. The processor 110, memory 112, and/or masking unit 118 may, for example, provide means for performing operation 730. Operation 740 may comprise setting pixel values within the mask to the calculated mask pixel value. The processor 110, memory 112, and/or masking unit 118 may, for example, provide means for performing operation 740. Operation 750 may comprise causing masking of the image with the mask. The processor 110, memory 112, user interface 116, and/or masking unit 118 may, for example, provide means for performing operation 740.

FIGS. 5-7 each illustrate a flowchart of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., a masking apparatus 102, workstation 202, PACS apparatus 206, or combination thereof) and executed by a processor (e.g., the processor 110) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for controlling luminance of non-tissue objects within a medical image, the method comprising:
determining one or more seed pixel values for an image;
determining, based at least in part on the one or more seed pixel values, one or more regions of the image that comprise a non-tissue object;
defining a mask comprising the determined one or more regions of the image that comprise a non-tissue object;
calculating, by a processor, a mask pixel value based at least in part on a defined luminance value;
setting pixel values within the mask to the calculated mask pixel value; and
causing masking of the image with the mask.

2. The method of claim 1, further comprising:
segmenting the image into a plurality of regions; and
wherein determining one or more regions of the image that comprise a non-tissue object comprises determining one or more of the regions of the segmented image that comprise a non-tissue object.

3. The method of claim 1, wherein determining one or more seed pixel values comprises determining one or more user-selected pixels, the one or more user-selected pixels being labeled as either mask pixels or non-mask pixels.

4. The method of claim 3, wherein:
determining one or more regions of the image that comprise a non-tissue object comprises applying a labeling algorithm to propagate the one or more seed pixel labels to one or more segmented regions of the image, resulting in one or more labeled regions of the image; and
defining the mask comprises defining the mask based at least in part on the one or more labeled regions of the image.

5. The method of claim 1, further comprising:
analyzing a histogram of the image; and
wherein determining one or more seed pixel values comprises determining a seed pixel value representing non-tissue objects based at least in part on a photometric interpretation of the image and on the analysis of the histogram.

6. The method of claim 5, wherein:
determining one or more regions of the image that comprise a non-tissue object comprises determining one or more regions of the image having an average pixel value satisfying a relationship criterion with respect to the seed pixel value determined to represent non-tissue objects; and
defining the mask comprises defining the mask based at least in part on the one or more regions of the image determined to have an average pixel value satisfying a relationship criterion with respect to the seed pixel value determined to represent non-tissue objects.

7. The method of claim 1, wherein calculating the mask pixel value comprises calculating the mask pixel value based at least in part on a Digital Imaging and Communications in Medicine (DICOM) Gray Scale Display Function (GSDF).

8. The method of claim 1, wherein calculating the mask pixel value comprises:
calculating an index value as a function of the defined luminance value; and
calculating the mask pixel value as a function of the calculated index value, a minimum luminance value of a monitor, and a maximum luminance value of the monitor.

9. The method of claim 8, wherein:
calculating the index value comprises calculating an index value, j(L), as a function of the defined luminance value, L, in accordance with $$j(L) = A + B \cdot \mathrm{Log}_{10}(L) + C \cdot (\mathrm{Log}_{10}(L))^2 + D \cdot (\mathrm{Log}_{10}(L))^3 + E \cdot (\mathrm{Log}_{10}(L))^4 + F \cdot (\mathrm{Log}_{10}(L))^5 + G \cdot (\mathrm{Log}_{10}(L))^6 + H \cdot (\mathrm{Log}_{10}(L))^7 + I \cdot (\mathrm{Log}_{10}(L))^8,$$

wherein $\mathrm{Log}_{10}$ represents logarithm to the base 10, and A=71.498068, B=94.593053, C=41.912053, D=9.8247004, E=0.28175407, F=−1.1878455, G=−0.18014349, H=0.14710899, I=−0.017046845;
in an instance in which the image is unsigned, calculating the mask pixel value comprises calculating a mask pixel value, X, as function of the calculated index value, a minimum luminance value of a monitor, $j_{min}$, and a maximum luminance value of the monitor, $j_{max}$, in accordance with $$X = \frac{j(L) - j_{min}}{j_{max} - j_{min}}(2^n - 1),$$

wherein n is a number of bits stored for each pixel value; and
in an instance in which the image is signed, calculating the mask pixel value comprises calculating a mask pixel value, X, as function of the calculated index value, a minimum luminance value of a monitor, $j_{min}$, and a maximum luminance value of the monitor, $j_{max}$, in accordance with $$X = \frac{j(L) - j_{min}}{j_{max} - j_{min}}(2^n - 1) - 2^{n-1},$$

wherein n is a number of bits stored indicated by a header of the image.

10. The method of claim 1, wherein the image comprises a mammogram image.

11. An apparatus for controlling luminance of non-tissue objects within a medical image, the apparatus comprising at least one processor, wherein the at least one processor is configured to cause the apparatus to at least:
determine one or more seed pixel values for an image;
determine, based at least in part on the one or more seed pixel values, one or more regions of the image that comprise a non-tissue object;
define a mask comprising the determined one or more regions of the image that comprise a non-tissue object;
calculate a mask pixel value based at least in part on a defined luminance value;
set pixel values within the mask to the calculated mask pixel value; and
cause masking of the image with the mask.

12. The apparatus of claim 11, wherein the at least one processor is configured to further cause the apparatus to:
segment the image into a plurality of regions; and
determine one or more regions of the image that comprise a non-tissue object at least in part by determining one or more of the regions of the segmented image that comprise a non-tissue object.

13. The apparatus of claim 11, wherein the at least one processor is configured to cause the apparatus to determine one or more seed pixel values at least in part by determining one or more user-selected pixels, the one or more user-selected pixels being labeled as either mask pixels or non-mask pixels.

14. The apparatus of claim 13, wherein the at least one processor is configured to cause the apparatus to:
determine one or more regions of the image that comprise a non-tissue object at least in part by applying a labeling algorithm to propagate the one or more seed pixel labels to one or more segmented regions of the image, resulting in one or more labeled regions of the image; and
define the mask at least in part by defining the mask based at least in part on the one or more labeled regions of the image.

15. The apparatus of claim 11, wherein the at least one processor is configured to further cause the apparatus to
analyze a histogram of the image; and
determine one or more seed pixel values at least in part by determining a seed pixel value representing non-tissue objects based at least in part on a photometric interpretation of the image and on the analysis of the histogram.

16. The apparatus of claim 15, wherein the at least one processor is configured to cause the apparatus to:
determine one or more regions of the image that comprise a non-tissue object at least in part by determining one or more regions of the image having an average pixel value satisfying a relationship criterion with respect to the seed pixel value determined to represent non-tissue objects; and
define the mask at least in part by defining the mask based at least in part on the one or more regions of the image determined to have an average pixel value satisfying a relationship criterion with respect to the seed pixel value determined to represent non-tissue objects.

17. The apparatus of claim 11, wherein the at least one processor is configured to cause the apparatus to calculate the mask pixel value at least in part by calculating the mask pixel value based at least in part on a Digital Imaging and Communications in Medicine (DICOM) Gray Scale Display Function (GSDF).

18. The apparatus of claim 11, wherein the at least one processor is configured to cause the apparatus to calculate the mask pixel value at least in part by:
calculating an index value as a function of the defined luminance value; and
calculating the mask pixel value as a function of the calculated index value, a minimum luminance value of a monitor, and a maximum luminance value of the monitor.

19. The apparatus of claim 18, wherein the at least one processor is further configured to cause the apparatus to:
calculate the index value at least in part by calculating an index value, j(L), as a function of the defined luminance value, L, in accordance with $$j(L) = A + B \cdot \text{Log}_{10}(L) + C \cdot (\text{Log}_{10}(L))^2 + D \cdot (\text{Log}_{10}(L))^3 + E \cdot (\text{Log}_{10}(L))^4 + F \cdot (\text{Log}_{10}(L))^5 + G \cdot (\text{Log}_{10}(L))^6 + H \cdot (\text{Log}_{10}(L))^7 + I \cdot (\text{Log}_{10}(L))^8,$$

wherein $\text{Log}_{10}$ represents logarithm to the base 10, and A=71.498068, B=94.593053, C=41.912053, D=9.8247004, E=0.28175407, F=−1.1878455, G=−0.18014349, H=0.14710899, I=−0.017046845;
in an instance in which the image is unsigned, calculate the mask pixel value at least in part by calculating a mask pixel value, X, as function of the calculated index value, a minimum luminance value of a monitor, $j_{min}$, and a maximum luminance value of the monitor, $j_{max}$, in accordance with $$X = \frac{j(L) - j_{min}}{j_{max} - j_{min}}(2^n - 1),$$

wherein n is a number of bits stored indicated by a header of the image; and
in an instance in which the image is signed, calculate the mask pixel value at least in part by calculating a mask pixel value, X, as function of the calculated index value, a minimum luminance value of a monitor, $j_{min}$, and a maximum luminance value of the monitor, $j_{max}$, in accordance with $$X = \frac{j(L) - j_{min}}{j_{max} - j_{min}}(2^n - 1) - 2^{n-1},$$

wherein n is a number of bits stored for each pixel value.

20. The apparatus of claim 11, further comprising at least one memory storing instructions that when executed by the at least one processor cause the apparatus to:
determine one or more seed pixel values for the image;
determine, based at least in part on the one or more seed pixel values, one or more regions of the image that comprise a non-tissue object;
define the mask;
calculate the mask pixel value;
set pixel values within the mask to the calculated mask pixel value; and
cause masking of the image with the mask.

21. A computer program product for controlling luminance of non-tissue objects within a medical image, the computer program product comprising at least one non-transitory computer-readable storage medium having computer-readable program instructions stored therein, the computer-readable program instructions comprising:
program instructions configured to determine one or more seed pixel values for an image;
program instructions configured to determine, based at least in part on the one or more seed pixel values, one or more regions of the image that comprise a non-tissue object;
program instructions configured to define a mask comprising the determined one or more regions of the image that comprise a non-tissue object;
program instructions configured to calculate a mask pixel value based at least in part on a defined luminance value;
program instructions configured to set pixel values within the mask to the calculated mask pixel value; and
program instructions configured to cause masking of the image with the mask.

* * * * *

UNITED STATES PATENT AND TRADEMARK OFFICE
CERTIFICATE OF CORRECTION

PATENT NO. : 8,401,285 B1
APPLICATION NO. : 13/233656
DATED : March 19, 2013
INVENTOR(S) : Rezaee et al.

Page 1 of 1

It is certified that error appears in the above-identified patent and that said Letters Patent is hereby corrected as shown below:

In the Specifications:

Column 8,
Line 49, "one, or more points" should read --one or more points--.

Column 15,
Line 54, "monochrome) image" should read --monochrome1 image--.

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,401,285 B1 | Page 1 of 1 |
| APPLICATION NO. | : 13/233656 | |
| DATED | : March 19, 2013 | |
| INVENTOR(S) | : Rezaee et al. | |

It is certified that error appears in the above-identified patent and that said Letters Patent is hereby corrected as shown below:

In the specification,

Column 8,
Line 40, "one, or more points" should read --one or more points--.

Column 15,
Line 54, "monochrome) image" should read --monochrome1 image--.

This certificate supersedes the Certificate of Correction issued August 27, 2013.

Signed and Sealed this
Third Day of November, 2015

Michelle K. Lee
*Director of the United States Patent and Trademark Office*